No. 666,901. J. MACPHAIL. Patented Jan. 29, 1901.
SAFETY DEVICE FOR HEADER ELEVATORS.
(Application filed Nov. 22, 1900.)
(No Model.)
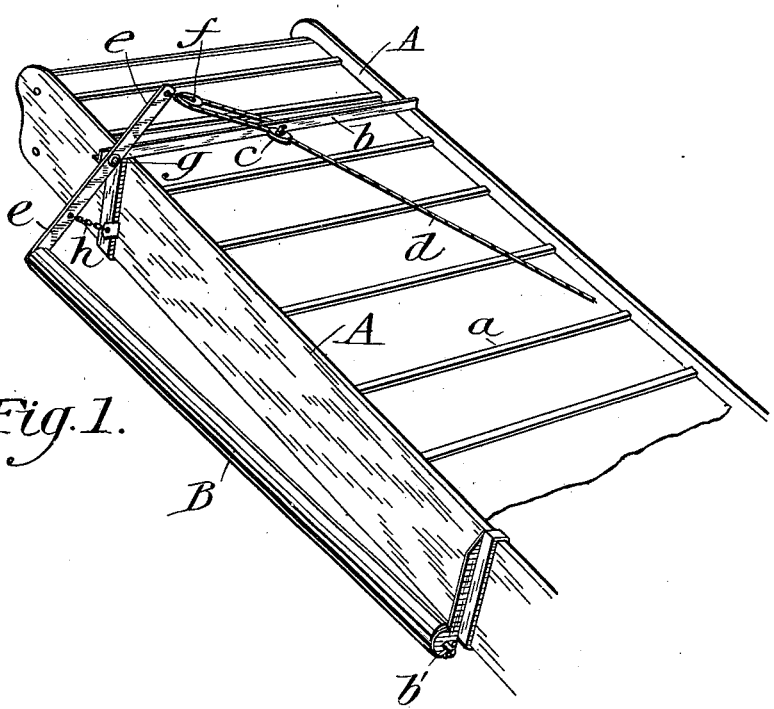
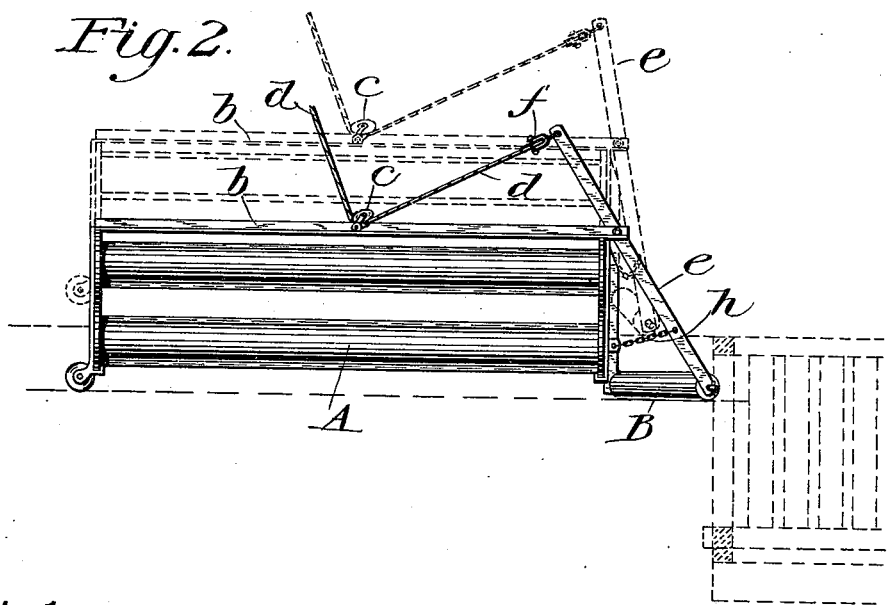
Witnesses:
Chas. M. Chambers.
Marvin Cramer
Inventor:
James Macphail
By his attys

UNITED STATES PATENT OFFICE.

JAMES MACPHAIL, OF CHICAGO, ILLINOIS, ASSIGNOR TO THE DEERING HARVESTER COMPANY, OF SAME PLACE.

SAFETY DEVICE FOR HEADER-ELEVATORS.

SPECIFICATION forming part of Letters Patent No. 666,901, dated January 29, 1901.

Application filed November 22, 1900. Serial No. 37,375. (No model.)

*To all whom it may concern:*

Be it known that I, JAMES MACPHAIL, a citizen of the United States, residing at Chicago, in the county of Cook and State of Illinois, have invented certain new and useful Improvements in Safety Devices for Header-Elevators; and I do hereby declare the following to be a full, clear, and exact description of the invention, such as will enable others skilled in the art to which it appertains to make and use the same.

The invention relates especially to harvesters of the type known as "headers," and the purpose of the invention is to protect the header-elevator from injury due to collisions and other accidental contact with obstacles. In this class of machines, as is well understood, the elevator is pivotally connected at its lower end to the harvester-frame and its upper end is suspended, overhanging the side of the machine, by ropes or cords attached at their outer ends to the upper portion of the elevator-frame and connected at their inner ends to some fixed point on the harvester-frame, preferably in a position to be conveniently reached by the driver. In connection with this arrangement a box-like receptacle that is mounted upon wheels and is separate from the harvester usually accompanies the machine, so as to receive the grain as it is delivered from the elevator. When this box is full, it is driven off to the thresher, and when its load has been emptied it is returned to position under the end of the overhanging elevator, ready to be filled again.

In returning the header-box to position it often collides with the elevator-frame, owing to accident or carelessness on the part of the driver, and the object of my invention is to protect the elevator from injury due to such collisions by providing it with a guard which is connected to the elevator-frame and projects in a position to be struck by a wagon or other object and is so connected with the raising and lowering mechanism of the elevator-frame that the outer end of the elevator-frame is lifted out of the way.

The invention will be clearly understood from the following description in connection with the drawings forming part of this specification, wherein—

Figure 1 is a perspective view of a portion of the elevator-frame, and Fig. 2 is an elevation looking at the outer end of the elevator, the header box or receptacle being indicated in dotted lines and the action of lifting the frame being also shown in dotted lines.

Referring to the views, A denotes an elevator-frame of any ordinary construction, carrying the usual slatted canvas $a$, which travels around rollers at the upper and lower ends of the frame in the usual manner. The connection of this frame with the harvester is not illustrated in the drawings, for the reason that it forms no part of the present invention and may be made in any one of many well-known ways. At its upper end the elevator-frame is provided with a cross-piece $b$, to which is attached the usual pulley $c$, over which runs the cord or rope $d$, by means of which the outer end of the elevator is suspended and by means of which its vertical position may be adjusted. As above indicated, the inner end of this rope is attached at some fixed point to the harvester-frame, and in the present invention I connect the outer end to an arm or lever $e$, preferably passing the rope through a pulley $f$, carried by the upper end of the lever, and attaching its extreme end to the cross-bar $b$. The lever $e$ forms part of the guard or safety device, which is the main feature of my invention. The preferred form of this guard consists of a roller B, extending lengthwise of the elevator-frame and having its lower end journaled in a bracket $b'$ and its upper end similarly journaled in the lower end of the arm $e$. The roller may be of any desired length and may be located on either or both sides of the elevator and should extend along that part of the frame most likely to be struck in case of accidental collisions. The arm $e$ is pivoted about midway between its ends to the elevator-frame—for example, at $g$—and is connected below the pivot to the elevator by means of a chain or other flexible connection $h$, the object of which is to limit the outward movement of the arm e, and consequently the roller B, from the side of the elevator frame.

The elevator being suspended at its outer end by the rope d, it will be understood that the weight of the frame, pulling on the upper end of the arm e, causes its lower end to stand out from the side of the frame, as indicated in full lines in the drawings, so that any object which would otherwise strike the elevator-frame would first contact with the roller. As indicated in dotted lines in Fig. 2, any object striking the roller would rock the lever e on its pivot and throw its upper end into the position shown in dotted lines, thereby taking up the cord or rope d and causing the outer end of the elevator to rise free of the obstruction into the position indicated in dotted lines in Fig. 2. The height to which the elevator may thus be lifted depends upon the length of the arm e and the amount of movement the roller B is allowed to have before it contacts with the side of the frame A.

I believe myself to be the first to provide a header-elevator with any sort of a guard or safety device that is so connected to the raising and lowering mechanism as to cause the elevator to be thus lifted in case of collisions, and I do not therefore desire to be limited to the details of construction herein illustrated and described.

What I claim, and desire to secure, is—

1. In a harvester, the combination with the header-elevator, of mechanism for raising and lowering the same, and a guard or safety device projecting from the elevator in position to protect it from collisions, said guard being connected with the raising and lowering mechanism so as to lift the elevator on being struck.

2. In a harvester, the combination with the header-elevator A, of a guard B extending along the elevator-frame, the cord or rope d for raising or lowering the frame, and a connection between said cord or rope and the guard, whereby any obstacle striking the guard will lift the elevator-frame.

3. In a harvester, the combination with the header-elevator A, of a cord or rope d for raising and lowering the same, a guard B extending along the elevator, an arm or lever e to the lower end of which the guard B is connected, and a connection between the cord or rope d and the upper end of the lever, whereby any obstacle striking the guard will rock the lever and lift the elevator-frame.

4. In a harvester, the combination with the header-elevator A, of the cord or rope d for raising and lowering the same, a guard B extending along the elevator-frame, and an arm or lever e pivoted between its ends to the frame and carrying one end of the guard B at its lower end, the upper end of said lever being connected with the cord or rope d, and the lower end being limited in its outward movement by means of the chain or other connection h.

In testimony whereof I affix my signature in presence of two witnesses.

JAS. MACPHAIL.

Witnesses:
CHAS. N. CHAMBERS,
J. H. PITKIN.